Feb. 22, 1949.  J. W. KEHOE ET AL  2,462,199
METHOD OF RESISTANCE WELDING USING PARTIALLY
SHEARED OUT PROJECTIONS
Filed April 14, 1944
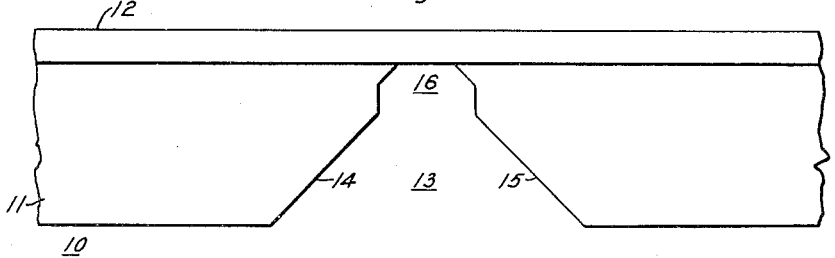
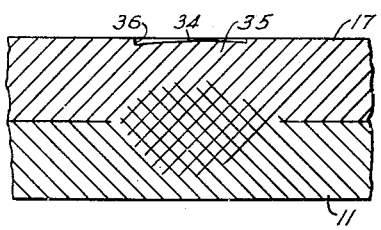
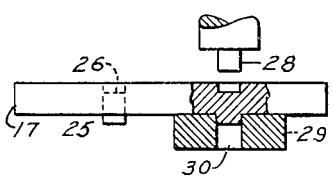
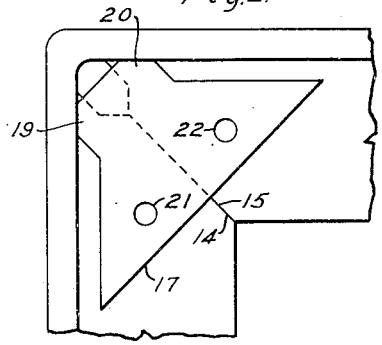
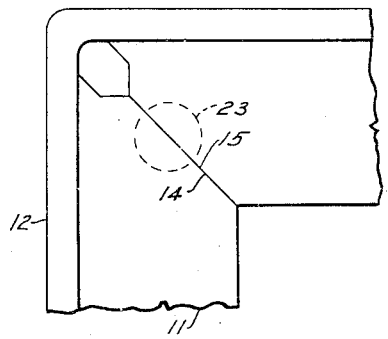
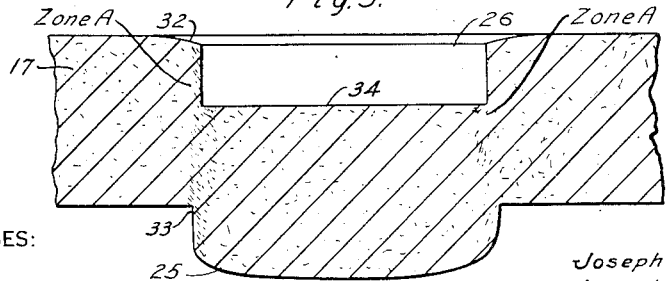
WITNESSES:
N. F. Susser
G. V. Giolma
INVENTORS
Joseph W. Kehoe an
Joseph B. Dym.
BY G. M. Crawford
ATTORNEY Patented Feb. 22, 1949

2,462,199

UNITED STATES PATENT OFFICE 2,462,199

METHOD OF RESISTANCE WELDING USING PARTIALLY SHEARED OUT PROJECTIONS

Joseph W. Kehoe, Wilkinsburg, and Joseph B. Dym, Pittsburgh, Pa., assignors to Westinghouse Electric Corporation, East Pittsburgh, Pa., a corporation of Pennsylvania Application April 14, 1944, Serial No. 531,040

5 Claims. (Cl. 219—10)

Our invention relates, generally, to resistance welding and it has reference, in particular, to methods of resistance welding structures.

Generally stated, it is an object of our invention to provide for welding structures in a manner which is simple and inexpensive to perform and is highly flexible in its application.

More specifically, it is an object of our invention to provide for using an ordinary punch press or "kick-press" for producing projections in members which are to be resistance welded together by the projection method.

Another object of our invention is to provide for producing projections on members for projection welding them together by punching portions partially out of the members by means of an open die and a punch such as are normally used in punching operations, so as to provide well defined molecular cleavage surfaces between the partially punched out portions and the members from which they are partially removed, whereby relatively high resistance current paths are provided to the members for producing heat internally when resistance welding the members together.

Yet another object of our invention is to provide for producing a weld projection on a member to be welded by the projection method by punching and partially shearing a core portion out of the member so as to cold work the metal about the periphery of the punched portion beyond the elastic limit.

Still another object of our invention is to provide for increasing the heat produced in the interior of a member to be projection welded by partially punching a portion of the material out of the member so as to produce a relatively restricted cleavage area between the molecules thereof and increase the resistance of the material adjacent the cleavage area by cold working it.

Other objects will in part be obvious, and will in part be disclosed hereinafter.

In accordance with our invention a relatively strong and inexpensive angle construction may be provided by shearing a portion out of one leg of the angle member, bending the other leg to bring the adjacent edges of the opening into adjoining relation and using the sheared out portion as a gusset. The gusset may be welded in bridged relation to the adjoining edge portions by forming projections on one side by a punching operation in a punch press of the usual type so as to deform the metal sufficiently abruptly to produce a closed zone of cleavage about the projections, and projection welding the gusset across the point between the adjoining edge portions.

For a more complete understanding of the nature and scope of our invention reference may be made to the following detailed description which may be read in connection with the accompanying drawing; in which:

Figure 1 is a plan view of an angle member which may be used to form an angle construction in accordance with the teachings of our invention.

Fig. 2 is a plan view of an angle construction using the portion removed from one leg of the angle member in Fig. 1 as a gusset;

Fig. 3 is a plan view of an angle construction utilizing the invention in another of its forms;

Fig. 4 is a partially sectioned side elevational view of the gusset illustrating the method of forming the weld projections thereon;

Fig. 5 is an enlarged sectional view of a weld projection reproduced from a photomacrograph of a section taken through a weld projection; and Fig. 6 is an enlarged reproduction of a sectional view through a projection weld made in practicing the invention.

Referring to Fig. 1 the reference numeral 10 may denote, generally, an angle member which may be used in forming a corner or an angle construction. The angle member may comprise a substantially horizontal leg portion 11 with a substantially vertical leg portion 12 positioned along one edge thereof. In order to provide an angle construction with any angular relation, and in this instance a substantially right angle bend in the angle member 10, a portion of the leg 11 shaped in accordance with the desired angular relation may be removed in a suitable manner, such as by a punching operation, leaving an opening 13 having angularly related edge portions 14 and 15 which in this instance are in substantially 90° relation, and which are disposed to be positioned in adjoining relation when adjoining portions of the leg member 12 are bent into the desired right angle relation. An opening 16 may be provided adjacent the leg portion 12 by means of recesses in the edge portions to facilitate bending of the leg portion 12 and to prevent binding of the edge portions 14 and 15 adjacent the inner end.

In order to reinforce the completed angle structure, the portion 17 which is removed from the leg portion 11 to provide the opening 13, may be used as a gusset, being, for example, positioned as shown in Fig. 2 in bridging relation across the adjoining edge portions 14 and 15. The inclined surface portions 19 and 20 of the removed portion 17 provide guide surfaces for engaging the adjacent angularly related portions of the vertical leg member 12 so as to position the gusset in predetermined relation on the angle member.

In order to provide for securing the gusset 17 to the leg 11 of the angle member 10, suitable means such as the welds 21 and 22 may be used. By using the portion removed from the leg member 11 as a gusset, it is possible to secure much more consistent and more satisfactory welds, since the metal of the gusset is identical with that of the leg 11 from which it was removed. In addition, more efficient use of the available material is made, and the amount of scrap is reduced.

In some constructions where it is desired to provide an angle construction without any obstruction on the surface of the leg portions 11, the adjoining edge portions 14 and 15 of the leg portion 11 may be sufficiently secured in abutting relation by means of a single spot weld 23 positioned in bridging relation between the edge portions as shown in Fig. 3. Such a construction is sometimes highly desirable where it is necessary to insert a panel flush with the surface of the leg member 11, as in some types of door constructions used in metal switchgear housing and the like.

In making spot welds between metallic members of many different shapes, sizes and materials we have found that greatly improved results may be secured over those securable by the usual spot welding methods, or by the projection welding method recommended by the American Welding Society wherein projections of different predetermined contours for different thicknesses of materials are produced by deforming a portion of a seat or plate into cup-shaped dies having the desired projection contours. These improved results are easily obtained by using the ordinary punch press or "kick-press" normally used for punching holes through sheet and plate material.

According to our invention projections 25 may be produced on one side of a member to be welded, such as, for example, the gusset 17 which is to be welded to the leg 11, by punching indentations 26 in the other side of the member by means of a punch 28 of the usual type used in punching holes, and which is of the shearing type, in conjunction with an open die 29 having an opening 30 therein affording a clearance fit for the punch 28 as shown in Fig. 4. By using a relatively blunt-faced and sharp-edged punch in conjunction with an open die, projections are produced such as shown in Fig. 5 wherein at least one, and possibly both of the surfaces 32 and 33 of the member at the back and front sides are actually sheared, and a plug or core 34 of the material is partially pushed out of the member leaving an indentation 26 at the rear end and providing a projection or protuberance 25 at the front.

An examination of actual photomacrographs taken of etched cross-sections of a number of such projections shows clearly that between the indentation and projection there is a concentrated zone A such as shown in Fig. 5 about the periphery of the core 34 wherein the metal has been cold worked to a relatively high degree producing distinct slippage or creepage planes between the molecules of the metal of the core and of the adjacent portions of the plate or sheet. As a result thereof the resistance of this peripheral zone to the flow of current is greatly increased. At the same time the actual cross-sectional area of contact between the plug or core 34 and the body of the member is reduced since the length of the zone or cold worked material remaining between the core 34 and the body of the member is much less than the original thickness of the member.

The gusset 17 may then be welded to the leg 11 by applying pressure and passing current through the members and projections in much the same manner that projection welds are usually made. Heat is developed at the projection 25 and in the slippage area between the core 34 and the body of the gusset member 17, so that the gusset is welded to the leg portion 11 and the core 34 is pushed back into and fused to the body of the gussets as shown in Fig. 6, producing a strong ductile weld. Such a weld may be identified by the indentation 35 which remains and generally has a relatively sharp-edge portion 36.

The factors of cold working, slippage and reduction in contact area all appear to cooperate in increasing the heat produced within the member when welding current is passed therethrough. A relatively large number of test results show that welds having much higher tensile strengths are produced between members welded by means of projections produced according to our invention than when the members are welded according to the usual practice. For example, with steel plates .094 inch thick and projections produced according to the American Welding Society standards, the average tensile strength of six test pieces was 4091 pounds. The average tensile strength of the same number of test pieces welded with projections produced according to our invention was 4166 pounds. Greater improvement is shown with thicker materials. For example, when .125 inch thick steel pieces were welded with projections of the usual type the average tensile strength of six test pieces was 5468 pounds, whereas that of the same number of test pieces welded with projections according to our invention was 6682 pounds. Projections may be produced by means of punching operations in accordance with our invention or pieces of steel or other materials as thick as 5/8 of an inch or more, which thickness is greater than any for which other types of projections may be produced.

In addition to having the advantages of being more easily produced with less expensive equipment and capable of being produced on materials in excess of the thickness for which other methods are adapted, the method of our invention is exceedingly flexible. The making of projection welds with the usual type of projection appears to be a critical process except with relatively thin material of less than 1/4 inch thickness, but with our invention several different heights of projections may be used for securing highly satisfactory welds with every different thickness of material. On steel of 1/4 inch thickness having projections of from 1/16 inch high to 1/16 inch high, weld heats from 60% to 90% of same current tap setting produced welds having strengths of from 13,035 pounds to 19,265 pounds. In general, greater projection heights require higher welding currents, although there is little to compare between the weld strength produced by relatively low projection heights with relatively low values of current and those of higher projections used with correspondingly higher current. For example, with a 1/16 inch high projection on 1/4 inch steel plate and the current control set on the 70% heat tap, welds were produced having a tensile strength of 19,950 pounds. A weld having a tensile strength of 19,265 pounds was produced by using a 1/16 inch high projection on the same thickness of plate with the 90% heat tap. Accordingly, it will be seen that for a given strength of weld any number of various projection heights may be used each of them with a relatively wide range of welding currents. Thus the discretion of the operator in making the welds becomes a much less critical element.

From the above description and the accompanying drawing, it will be apparent that we have provided in a simple and effective manner for producing welds between metal members which have much higher tensile strength than welds that were heretofore possible to produce by known methods. In addition, the method of our invention assists greatly in maintaining quality welds despite slight changes in welding current, and it also greatly reduces the possibility of unsatisfactory welds due to the improper choice of or unforeseen variations in the welding current. In addition, welds may be made between members of greatly varying thicknesses and of much greater thicknesses than it was heretofore possible to accommodate.

Since certain changes may be made in the above description and different combinations may be made without departing from the scope or spirit of the invention, it is intended that all the matter contained in the above description or shown in the accompanying drawing shall be considered as illustrative and not in a limiting sense.

We claim as our invention:

1. The method of projection welding a pair of metallic members together which comprises, forming a projection on one of the members by moving a core of metal relative to the body of the member and reducing the area of contact therebetween by partially shearing a substantially cylindrical core of uniform cross section out of the member by a punching operation, positioning said one member with the projection in engagement with the other member, applying pressure to the members by means of a current conducting electrode positioned on the member at the rear of the projection, and passing an electric current through the said one member, and the reduced area of contact into the projection and the other member so as to produce sufficient heat to effect a zone of fusion including the partially sheared out portion and both of the members.

2. A method of projection welding metallic members together which comprises, producing a projection on the side of one member which is adjacent to the other by producing a like indent on the opposite side and locally deforming a portion of the one member sufficiently abruptly to so move said portion bodily relative to the rest of the member as to produce a definite line of slippage between molecules between the deformed and non-deformed portions in the area of which the metal is cold worked, placing the members with the projection engaging the other member, and passing a weld current through the members, the cold worked area and projection while applying pressure therebetween.

3. The method of projection welding metallic members which comprises, forming a projection on one member to be welded by applying pressure to one side of the member and locally deforming a portion of the member to partially shear a core portion from the member to produce substantially identically shaped indent and projections on opposite sides of the member and reduce the area of contact of the core portion with the remainder of the member, positioning said one member with the projection adjacent the other member, applying pressure and passing welding current between the members through the reduced area of contact and the projection to fuse the members at the projection.

4. A method of projection welding metallic members which comprises, forming a projection on one member by so punching an indent in one side to shear at least one surface of the member as to produce a closed cleavage surface in the metal of said one member whereby the metal is cold worked to provide a relatively high resistance path about the outline of the punch along closed surface through the member which defines a core of metal and partially remove the core defined thereby without deforming the projection portion of the core, positioning the members with the projecting portion of the partially removed core engaging the other member, and applying pressure and passing a welding current through the members and the projection including the high resistance path.

5. The method of projection welding which comprises, punching a circular indent in one side of a metal member and supporting the member on the opposite side about the projection of said circular indent so as to move a cylindrical core of metal relative to and partially shear it from the member and produce a closed cylindrical cleavage surface through the member and a projection on the opposite side defined by said cleavage surface, positioning the metal member with the projection engaging a metal member to which it is to be welded, applying pressure at the projection, and passing a current from the one member through the cleavage surface, through the core and the other member to effect fusion of the core to the members and of the members to each other.

JOSEPH W. KEHOE.
JOSEPH B. DYM.

REFERENCES CITED

The following references are of record in the file of this patent:

UNITED STATES PATENTS

| Number | Name | Date |
|---|---|---|
| 347,546 | Wood | Aug. 17, 1886 |
| 690,958 | Hunter | Jan. 14, 1902 |
| 846,480 | Lachman | Mar. 12, 1907 |
| 1,064,338 | Katzinger | June 10, 1913 |
| 2,049,925 | Rafter | Aug. 4, 1936 |
| 2,193,298 | Schottenberg | Mar. 12, 1940 |
| 2,299,001 | Anderson | Oct. 13, 1942 |
| 2,336,791 | La Barre | Dec. 14, 1943 |

FOREIGN PATENTS

| Number | Country | Date |
|---|---|---|
| 147,154 | Great Britain | May 12, 1921 |
| 78,133 | Switzerland | Nov. 16, 1918 |

OTHER REFERENCES

Gillette et al., "How to use resistance welding," American Machinist, November 11, 1943, page 96.